Jan. 9, 1962 M. BRETT ETAL 3,016,193
OVERFLOW INDICATOR
Filed Feb. 19, 1960
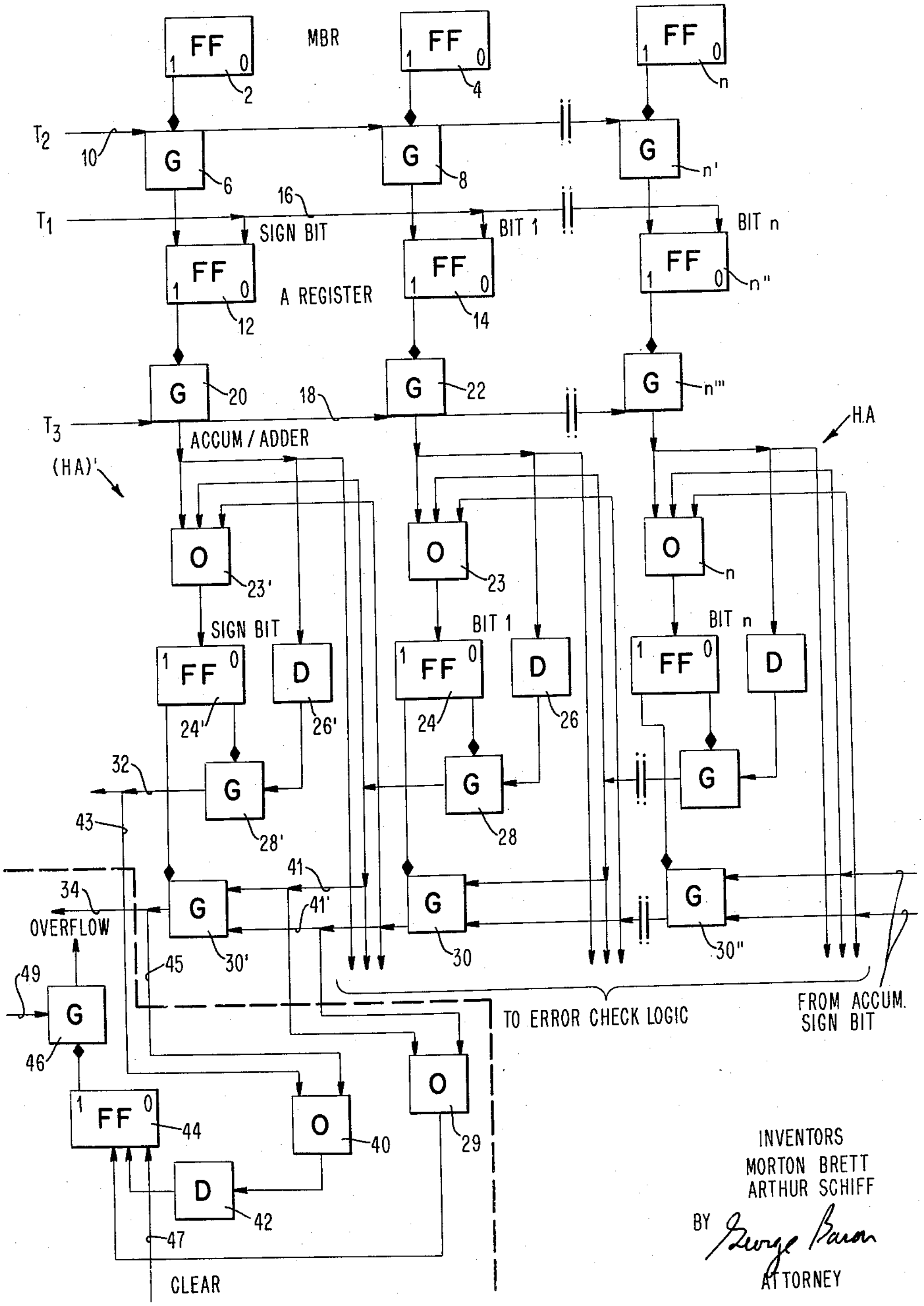
INVENTORS
MORTON BRETT
ARTHUR SCHIFF
BY George Baron
ATTORNEY United States Patent Office 3,016,193

Patented Jan. 9, 1962

3,016,193
OVERFLOW INDICATOR

Morton Brett, Woodstock, and Arthur Schiff, Kingston, N.Y., assignors to International Business Machines Corporation, New York, N.Y., a corporation of New York Filed Feb. 19, 1960, Ser. No. 9,759
5 Claims. (Cl. 235—153)

This invention relates to computer circuits generally, but more particularly to a circuit for detecting overflow conditions that may occur in information storage devices employed in high speed computers.

Many high-speed computing machines employ the binary system for representing alphanumerical information. Information is stored in a bistable device which is capable of assuming either of two stable states so that a first of such two states indicates the storage of a "0" and the second state indicates the storage of a "1." In the case where the stored information represents numerical information, the binary number would be represented as a series of "0's" and "1's." For example, the number seven would be represented as 111, the number eleven as 1011. Where the number is also designated as positive or negative, a binary point separates the number from its designation so that 1.0100 indicates —11 in One's complement form and 0.1011 indicates +11, the designation "1" being representative of a negative number and "0" the designation of a positive number. Each binary number can be representative of a whole integer or a fraction. For example, the binary number 0.1011 indicates the sum of $2^3+0+2^1+2^0$ or $8+2+1=11$, and the "0" to the left of the binary point indicates that the number is positive. When the binary number is a fraction then 0.1011 indicates the sum of $\frac{1}{2}+0+\frac{1}{2}^3+\frac{1}{2}^4$ or $$0.50+0+0.125+0.0675=0.6925$$

which is a positive fraction, whereas 1.0100 represents the negative fraction —0.6925. In both representations, whether the binary number is a whole number or a fraction, the most significant order of the binary number is the leftmost bit or order. For example, whether 0.$\underline{1}$0110 is a fraction or a whole number, the underlined "1" represents the most significant bit of the binary number.

When two binary numbers are to be added, the sum is normally transmitted to a storage register, or the register in which an augend is stored is modified in accordance with the value of the addend associated with such augend, the sum then residing in the modified register. No matter how the sum is attained, there will be a register of bistable elements for storing such sum. The capacity of the register will be limited, that is, it can store a maximum number. Consequently, if the addition results in a number that exceeds the capacity of the register, an overflow condition will result. The overflow condition will result in the storage of an erroneous sum in an accumulator or register. Such overflow condition must be detected so as to prevent any further operation on the false or erroneous sum. When the computing machine deals only in fractions, a sum result of one or more, or of —1 or less, will cause an overflow condition. Where integers are summed, a sum in excess of the capacity of the accumulator will produce an overflow. Since an overflow condition will exist when the sum of two numbers, positive or negative, exceeds the capacity of the register or accumulator wherein such sum is housed, means must be provided for detecting such overflow condition, yet not add substantially to the components needed to perform the addition process.

The overflow indicator circuit employed in the present invention expresses an overflow condition as a function of the sum of the carries resulting from the addition of the most significant bit of the addend and augend as well as the sign bits of the addend and augend. If the sum of the carries of such four bits is even, there is no overflow. If the sum of the carries is odd, then there is an overflow. The logic that permits such a simple determination will be described in greater detail hereinafter.

Consequently, it is an object to obtain an overflow indicator for a binary computer using a One's complement system.

It is a further object to obtain such overflow indicator yet not add substantially to the circuitry and number of components of the binary computer employing such overflow indicator.

Still another object is to obtain an overflow indicator that will operate whether fractions or integers are being added. The foregoing and other objects, features and advantages of the invention will be apparent from the following more particular description of a preferred embodiment of the invention, as illustrated in the accompanying drawings.

The sole FIGURE shows the overflow indicator employed with an adder, only a portion of the latter being shown. The novel overflow circuit is shown separated by dotted lines from the accumulator-adder to segregate it from the latter portion of the figure.

The type of adder employed in the present invention is a delay line parallel adder. Such adder performs addition by taking the contents of a specified memory location (referred to as the "A register") and adding such contents to the contents of a second register (referred to as an "accumulator-adder"), the accumulator-adder being modified in accordance with the transferred contents of the A register so that the sum remains in the accumulator. Normally the contents of the A register remain unaltered during such transfer to the accumulator, but overflow conditions are possible in the accumulator. How such overflow conditions are detected can be understood by referring to the drawing and its corresponding description.

The A register will consist of a plurality of flip-flops, henceforth identified as FF, or bistable elements 12, 14, . . . $n''$ for storing the binary word or number that is to be added to the number already in the accumulator. The first FF 12 will store the sign of the number and the FF's 14, . . . $n''$ will house the value of the number. In some computers, $n$ is equal to 50. Associated with each bit in a memory storage register is a gate 6, 8, . . . $n'$, all of which are sampled at time $T_2$ along line 10 to effect the transfer of the stored word to the A register. The stored word is in a memory buffer register (MBR) consisting of FF's 2, 4, . . . $n$. At some previous time $T_1$, FF's 12, 14, . . . $n''$ were set to their respective "0" states by a setting pulse that appeared on line 16. An Add pulse appearing on line 18 at time $T_3$ will sample gates 20, 22, . . . $n'''$ to effect the addition of the information in the A register to the accumulator.

The accumulator-adder, as was noted hereinabove, serves the dual role of adding its contents to that which is transferred to it from the A register and retaining the result of such addition. The accumulator-adder comprises $n$ units of half-adders H.A., and an additional half-adder (H.A.)′ unit for the sign bit. Each half-adder, starting with the least significant bit $n$ and moving to the left toward the most significant bit 1, includes an OR gate 23, a flip-flop 24, a delay unit 26, a slow-carry gate 28 and a fast-carry gate 30.

The accumulator-adder adds and stores the sum in the following manner. At time $T_1$, the flip-flops 12, 14, . . . $n''$ of the A register are set to their respective "0" states by a resetting pulse appearing on line 16. In the meantime, gates 6, 8, . . . $n'$ have been conditioned in accordance with the states of their associated flip-flops 2, 4, . . . $n$. At time $T_2$, gates 6, 8, . . . $n'$ are sampled, causing the information residing in flip-flops 2, 4, . . . $n$ to be non-destructively read out to flip-flops 12, 14, . . . $n''$. At time $T_3$, the command pulse Add is applied to all the gates 20, 22, . . . $n'''$, and those latter gates that are each conditioned by a flip-flop 12, 14, . . . $n''$ and its "1" state will transmit such Add pulse through its associated OR gate 23, 23′, etc. and complement its corresponding flip-flop 24, 24′, etc. to complete the half-add function. Each output pulse from the A register gates 20, 22, . . . $n'''$ that passes through OR gates 23, 23′, etc. also generates a potential carry pulse by sensing a gate, such as slow-carry gate 28, through delay unit 26, such gate 28 being conditioned by the "0" side of its corresponding flip-flop 24. A carry to the next high order will exist only when an A register flip-flop and its corresponding flip-flop in the accumulator-adder are each in the "1" state. If either related flip-flop of an associated pair, such as flip-flop 12 and 24′, or 14 and 24, is in a "0" state, then no carry pulse is passed by its corresponding slow-gate 28′ or 28.

The add pulse, transferred from the A register, is temporarily stored in a delay unit prior to sampling its corresponding slow-carry gate because a higher-order flip-flop immediately adjacent such delay unit might have been complemented when the Add pulse appeared on line 18. The delay unit permits such higher-order flip-flop to settle or resolve to its complemented state before being complemented again by the output of a slow-carry gate. For example, if at the $T_3$ time, when the instruction Add was given, FF 24′ and FF 24 were each in the "1" state, and the A register FF's 12 and 14 were also in their respective "1" states, then FF's 24′ and 24 would be complemented, each conditioning their corresponding slow-carry gates 28′ and 28. The slow-carry pulse going through gate 28 will have to be delayed by delay unit 26 until FF 24′ has settled in its "0" state, such delayed carry pulse then complementing FF 24′, through OR circuit 23′, back to its "1" state. To complete the addition process, it is necessary to send back any carry passing through either gate 28′ or 30′ along lines 32 or 34 to the fast carry gate 30″ associated with the least significant bit in the accumulator-adder. Such "end-around carry" is a necessary part of this type of addition logic since the addition cannot be completed unless the carries, if any, that are produced in the sign bit of the accumulator-adder can be added to the least significant bit to continue the addition process until no more carries are generated. The accumulator-adder now houses the sum of its previous number and the number transmitted to it from the A register.

The means for detecting any overflow condition that might have arisen during the above-described addition consists solely of an OR gate 29, OR 40, a delay unit 42, a flip-flop 44 and a sampling gate 46 for sensing an overflow condition. The outputs of the carry gates 28 and 30 of the most significant bit of the accumulator-adder is fed along lines 41 and 41′ through OR 29 to complement FF 44 directly whereas the outputs of gates 28′ and 30′ associated with the sign bit FF 24′ are fed along lines 43 and 45 through OR 40 and delay unit 42 to complement FF 44. A clearing pulse appears on line 47 to set FF 44 to its "0" state before any Add operation is begun whereas overflow indicating gate 46 is conditioned to pass a sampling pulse appearing on line 49 only when FF 44 is in its "1" state.

A few examples will suffice to illustrate the invention, such examples employing an accumulator-adder with a capacity of seven (3 binary orders), or 0.111, it being understood that the capacity could very well be extended to fifty bits or more. The logic of the overflow indicator requires that carries from the most significant bit FF 24 be directly stored in the overflow FF 44 through line 41 and OR circuit 29, whereas carries from the sign FF 24′ are delayed by delay unit 42 before they complement overflow FF 44. This delay is inserted since carries from the sign bit and the most significant bit can occur simultaneously, and means must be provided to permit both such simultaneous carries to separately complement overflow FF 44.

*Example 1*

| | | |
|---|---|---|
| Contents of A register | 0.010 | (+2) |
| Contents of Acc-Adder | 0.101 | (+5) |
| | 0.111 | (+7) |

Since there are no carries from either the sign bit or the most significant bit, there is no overflow.

*Example 2*

| | | |
|---|---|---|
| Contents of A register | 1.101 | [1] (−2) |
| Contents of Acc-Adder | 1.110 | (−1) |
| | 1.011<br>+1 | |
| | 1.100 | (−3) |

[1] In many binary computers, when a binary number 010 (2) is negative it is represented in its complemented form, or as 101.

In Example 1, there were no carries from either the sign bit or the most significant bit, so overflow FF 44 remains in its reset "0" state, overflow indicator gate 46 remaining deconditioned. In Example 2, there were two carries generated, one from the most significant bit and one from the sign bit, which meant that FF 44 was complemented twice, leaving the latter in its "0" state, or no "overflow" state.

*Example 3*

| | | |
|---|---|---|
| Contents in A register | 0.101 | (+5) |
| Contents in Acc-Adder | 0.100 | (+4) |
| | 1.001 | (+9) |

Example 3 represents overflow, since only one carry has been generated during the add process, such carry coming from the most significant bit. When a sampling pulse is applied to gate 46 along line 49 after the addition of Example 3 was completed, an overflow indication would be sensed by a suitable alarm circuit adapted to receive the pulse transmitted by gate 46.

*Example 4*

| | | |
|---|---|---|
| Contents in A register | 1.010 | (−5) |
| Contents in Acc-Adder | 1.010 | (−5) |
| | 0.100<br>+1 | |
| | 0.101 | (−10) |

In Example 4 an overflow signal would result because only one carry (from the sign bit) was generated during the addition process so FF 44 would be in its "1" state after the addition process was over.

As the four examples illustrate, one is able to detect overflow in adding one long word (50 or more bits) to another long word by the simple expedient of testing whether an odd number or an even number of carries has been generated in adding the most significant bits and the sign bits. The inspection of only the sign bit conditions and most significant bit conditions permit one to use the small amount of equipment shown to test for overflow.

The present invention has another desirable feature not formerly available to other overflow indicators. For example, a sequence of instructions, such as Add, Subtract, may be required to produce a final result in the accumulator-adder. The accumulator may produce overflow conditions during such intervening instructions, but the final instruction may result in a final sum that is within the capacity of the accumulator. The overflow indicator is, in effect, self-correcting in that there is no need to clear FF 44 after each instruction has been carried out by the accumulator-adder. Another example will illustrate this "self-correcting" feature.

*Example 5*

| | | |
|---|---|---|
| Contents in A register | 0.110 | (+6) |
| Contents in Acc-Adder | 0.100 | (+4) |
| | 1.010 | (+10) (one carry generated) |

At this time, the accumulator is in an overflow condition and FF 44 is in its "1" state. The next instruction might be subtract 5 from the contents of the accumulator.

| | | |
|---|---|---|
| Contents in A register | 1.010 | (%5) |
| Contents in Acc-Adder | 1.010 | (+10) implied |
| | 0.100 | |
| | +1 | |
| | 0.101 | (+5) (one carry generated) |

The single carry generated resets FF 44 to its "0" state which indicates the fact that the accumulator is no longer in an overflow condition. Thus the overflow indicating FF 44 need not be constantly reset after each overflow condition, so long as only one overflow condition is caused as a result of a series of instructions.

The type of flip-flops, gates, OR circuits, and delay units employed in carrying out this invention are conventional and may include diode circuits, tube or transistor circuits, magnetic core circuits, etc. All that is required is that the components that are selected be in harmony with one another and have those characteristics and operating speeds that will carry out the logic set forth. The lines bracketed and labelled "To Error Check Logic" are for the purpose of carrying signals to check errors other than overflow conditions and they form no part of the present invention.

Thus it is seen that the present invention is a very simple but effective scheme for testing the overflow condition of an accumulator, yet has the added feature of being self-correcting.

While the invention has been particularly shown and described with reference to preferred embodiments thereof, it will be understood by those skilled in the art that the foregoing and other changes in form and details may be made therein without departing from the spirit and scope of the invention.

What is claimed is:

1. Means for detecting the overflow condition of a register of bistable elements, such register storing a sign bit as well as a plurality of bits to represent a number in binary form, means for adding a second sign bit and its associated binary number to said register so as to modify the latter to include the sum of said two sign bits and binary numbers, such modification resulting in the production of carry signals from a bistable element of a low order bit to the next immediate higher order bit of said register when each of such low order bistable elements is modified from a predetermined state to its other state, a bistable device for storing the number of carries so produced, whereby an even number of carries will leave such bistable device in its "non-overflow" state and an odd number of carries will change such bistable device in its "overflow" state.

2. Means for detecting the overflow condition of an accumulator-adder register wherein the latter stores a binary number, adds its contents to a second binary number, and houses the sum of said two numbers, said accumulator-adder comprising a series of half-adder units representative of all the orders of said sum in said register including the sign bit of said sum, means for generating a carry signal from a low order bit to a higher order bit in said accumulator-adder register, further means for sensing the number of carries generated by the sign bit and the most significant bit of said register whereby the sensing of an odd number of carries will indicate an "overflow" condition in said accumulator-adder and an even number of carries will indicate a "no-overflow" condition in said accumulator-adder.

3. Means for detecting the overflow condition of a first register of bistable elements, said first register having a plurality of bistable elements for storing a sign bit and its associated binary number, a second register of bistable elements for storing a sign bit and its associated binary number, means for transferring the contents of the second register to the first register so that the latter register assumes the sum and sign of the contents of both registers, a single bistable element for indicating overflow conditions of said first register, said bistable element having a "no-overflow" indicating state and an "overflow" indicating state, means for setting said indicating bistable element to an initial "no-overflow" state, and means for sampling the combined changes in states of the most significant bit and the sign bit of said first register after said transfer has been completed and said single bistable element has been set to its "no-overflow" indicating state, whereby an odd number of combined changes in states of said sign bit and said most significant bit of said first register will switch said single bistable element to its "overflow-indicating" state, but an even number of such combined changes will leave said single bistable element in its "no-overflow" indicating state.

4. Means for detecting the overflow condition of a register of bistable elements, such register storing a sign bit as well as a plurality of bits to represent a number in binary form, means for adding a second sign bit and its associated binary number to said register so as to modify the latter to include the sum of said two sign bits and binary numbers, each bistable element in said register including a first gate for passing a fast carry signal from a low order bit to the next immediate higher order bit and a second gate for passing a slow carry signal from a low order bit to the next immediate higher order bit, a bistable device for storing the overflow condition of said register, means for setting said bistable device to its "non-overflow" state, first means for feeding the outputs of the slow and fast carry gates associated with the sign bit to said bistable device so as to complement the state of said bistable device, second means for feeding the outputs of the slow and fast carry gates associated with the most significant bit of said register to complement said bistable device, means for segregating the outputs of the sign bit from the outputs of the most significant bit so that such outputs complement such bistable device at different times whereby an even number of complements of said bistable device will indicate a "no-overflow" condition and an odd number of complements of said bistable device will indicate an "overflow" condition.

5. Means for detecting the overflow condition of an accumulator-adder register wherein the latter stores a binary number, adds its contents to a second binary number, and houses the sum of said two numbers, said accumulator-adder comprising a series of half-adder units representative of all the orders of said sum in said register including the sign bit of said sum, means for generating a carry signal from a low order bit to a higher order bit in said accumulator-adder register, further means for sensing the number of carries generated by the sign bit and the most significant bit of said register including two OR circuits, a delay unit and a flip-flop, means for setting said flip-flop to a first "non-overflow" indicating state, a first OR circuit accepting the carries produced by the sign bit and the second OR circuit accepting the carries produced by the most significant bit, said delay unit being in series with the output of said first OR circuit, and means for feeding the respective outputs of said delay unit and said second OR circuit as input signals to said flip-flop whereby an odd number of such input signals will switch said flip-flop to its "overflow" indicating state and an even number of such input signals will leave said flip-flop in its "non-overflow" indicating state.

No references cited.